United States Patent [19]

Turcotte et al.

[11] Patent Number: 4,922,156

[45] Date of Patent: May 1, 1990

[54] INTEGRATED POWER CAPACITOR AND INDUCTORS/TRANSFORMERS UTILIZING INSULATED AMORPHOUS METAL RIBBON

[75] Inventors: David E. Turcotte; Waseem A. Roshen; Dale F. Regelman, all of Tucson, Ariz.

[73] Assignee: ITT Corporation, New York, N.Y.

[21] Appl. No.: 179,342

[22] Filed: Apr. 8, 1988

[51] Int. Cl.⁵ ............................................. H05B 41/14
[52] U.S. Cl. .................................. 315/244; 315/239; 336/213; 361/270
[58] Field of Search ...................... 315/244, 243, 239; 361/270; 336/223, 69, 218, 219, 20, 213, 192, 234

[56] References Cited

U.S. PATENT DOCUMENTS

| | | | |
|---|---|---|---|
| 2,011,555 | 8/1935 | Burlingame | 361/308 |
| 2,521,513 | 9/1950 | Gray | 315/243 |
| 2,524,754 | 10/1950 | Bjorklund | 175/357 |
| 3,327,184 | 6/1967 | Valley | 361/309 |
| 3,555,466 | 1/1971 | Bernstein | 333/76 |
| 3,911,332 | 10/1975 | Kunkel | 317/157.62 |
| 4,211,957 | 7/1980 | Alley et al. | 315/276 |
| 4,327,311 | 4/1982 | Wroblewski | 315/244 |
| 4,364,020 | 12/1982 | Lin et al. | 336/212 |
| 4,368,407 | 1/1983 | Wròblewski | 315/291 |
| 4,368,447 | 1/1983 | Inomata et al. | 336/20 |

FOREIGN PATENT DOCUMENTS 60-23381 4/1986 Japan.

Primary Examiner—Eugene R. Laroche
Assistant Examiner—Ali Neyzari
Attorney, Agent, or Firm—Thomas L. Peterson

[57] ABSTRACT

A discrete device in which a capacitive and inductive function has been integrated is comprised of at least two insulated amorphous ribbons which are spirally wound to form a cylindrical toroid. Each of the amorphous metal ribbons is insulated from each other ribbon by a dielectric layer and wound in a stacked configuration to provide the capacitive function. Two conductive windings are then wrapped around segments of the cylindrical toroid to provide inductive and/or transforming functions as desired. A magnetic circuit is formed through the windings by the amorphous metal ribbons. A dielectric insulating layer between the ribbons is offset from the longitudinal edge of the ribbon so that the longitudinal edge of each ribbon is exposed. One ribbon has its longitudinal edge exposed on one surface of the toroid while another ribbon has its longitudinal edge exposed on the opposing surface of the toroid. Electrical contacts are then laid across an intersecting line contacting the exposed edge of each ribbon at a plurality of points. As a result, the electrical series resistance of each ribbon within the device is minimized thereby rendering a device practical for use within a power circuit.

20 Claims, 1 Drawing Sheet

INTEGRATED POWER CAPACITOR AND INDUCTORS/TRANSFORMERS UTILIZING INSULATED AMORPHOUS METAL RIBBON

BACKGROUND OF THE INVENTION

1. FIELD OF THE INVENTION

The invention relates to the field of discrete electrical elements used in power circuits and in particular to components in power circuits which integrate both a capacitive and inductive function into a single device.

2. DESCRIPTION OF THE PRIOR ART

In power circuits, utilizing high voltages or currents, discrete capacitive and inductive elements are predominantly utilized. Transformers and inductors which utilize ferrite cores or amorphous metal cores are also well known. However, there are several shortcomings in the use of discrete components in power circuits.

Firstly, the miniaturization or integration of power circuits and components therein has lagged far behind that of other types of circuitry. Therefore, the size of such components continues to be a major design limitation.

Secondly, as power circuits have grown in sophistication, the number of components within them has also grown. However, when utilizing discrete components, the mean time between failures increases in proportion to the number of components. Therefore, the reliability of power circuits continues to be a primary concern to designers.

Thirdly, the cost of discrete components has increased relative to other electrical components since more fabrication steps required to assemble power electronics products from discrete components, each of which performs a separate function, than might otherwise be possible if the functions could somehow be integrated into a smaller number of devices.

Integrated components in which capacitive and inductive functions are simultaneously performed have been utilized in applications other than in power circuitry. For example, in lamp circuitry, ballasts for fluorescent lamps have been devised which perform both capacitive and inductive functions. See ALLEY et al., "*Amorphous Metal Lamp Ballast Having a Capacitor Integral with the Magnetic Core*", U.S. Pat. No. 4,211,957 (1980). ALLEY illustrates an inner amorphous metal magnetic core 11 in FIG. 1 around which there is a primary inductive coil 15 and a secondary inductive coil 16. Amorphous metal end yokes 12 and 13, outer yoke 14 and windings 15 and 16 encase an inner core 11. The amorphous metal inner core is accordian-pleated as shown in FIGS. 1, 6 and 10, spirally wound as shown on FIGS. 3, 5, 8 and 11, or cylindrically wound as shown in FIG. 9. However, electrical connection is made to the co-wound ribbons of amorphous metal core by attachment to the ends of each length of the ribbon as shown in FIG. 3, which allows the full length of the ribbon, which may be several feet, to effectively contribute to the series resistance of the device.

A high electrical series resistance in a dicrete component in a power circuit is highly undesirable, and this renders a device of ALLEY's design of little or no use in power circuitry. In ALLEY's application the electrical efficiency of the lamp ballast is not a critical factor, since all the power delivered to a lamp circuit is consumed in it. In contrast consumption of power within a power circuit is highly undesirable and ideally all the power would be transferred from the power source through the power circuit to the ultimate load.

GRAY, "*Stationary Induction Apparatus*", U.S. Pat. No. 2,521,513 (1950), shows a discrete device in which the capacitive and inductive functions are combined in a cap-reactor. GRAY's cap-reactor has an inductive winding mounted on a magnetic core. The winding is constructed of insulated conductive foils. Therefore, the windings can simultaneously act as a capacitor and as inductors. However, in GRAY the capacitive and inductive functions are inherently combined through the structure of the device and cannot be separately utilized in the circuit. Thus, GRAY shows an integrated network performing capacitive and inductive functions, but not an integrated device which separately performs both capacitive and inductive functions.

Similar in this respect to GRAY is the teaching of KUNKEL, "*Wound Transformers and Mchine for Making the Same*", U.S. Pat. No. 3,911,332 (1975), and WROBLEWSKI, "*Inductor-Capacitor Impedance Devices and Method of Making the Same*", U.S. Pat. No. 4,327,311 (1982).

What is needed then is a design for an integrated device which simultaneously and independently performs capacitive and inductive functions, but which can be efficiently utilized in a power circuit.

BRIEF SUMMARY OF THE INVENTION

The invention is an integrated electrical device for independently providing a capacitive and inductive function comprising a plurality of insulated amorphous metal ribbons. Each ribbon is characterized by a longitudinal length. The plurality of insulated ribbons are disposed in proximity to each other in a stacked relationship. The plurality of stacked amorphous metal ribbons are wound on themselves to form a compact configuration. At least one of the ribbons has an exposed edge at least along a plurality of points along its longitudinal length. At least one conductive winding has at least one loop wound about the compact configuration of the plurality of ribbons. At least one electrical connector is disposed in proximity to the compact configuration of the plurality of ribbons and is electrically coupled to the above recited plurality of points along the longitudinal edge of the one ribbon.

As a result, the device independently and simultaneously performs the capacitive and inductive functions with minimized electrical series resistance for the device.

Each insulated ribbon is comprised of a first layer of dielectric material and a second layer of amorphous metal. The dielectric layer and amorphous metal are offset with respect to each other. The amorphous metal ribbon is offset from its corresponding dielectric layer to expose a longitudinal edge of the amorphous metal ribbon. The compact configuration is a cylindrically wound toroid of the plurality of ribbons.

Each insulated ribbon is comprised of a first layer of dielectric material and a second layer of amorphous metal. The dielectric layer and amorphous metal are offset with respect to each other, and the offset amorphous metal ribbon is offset from its corresponding dielectric layer to expose a longitudinal edge of the amorphous metal ribbon.

In the illustrated embodiment the plurality of amorphous metal ribbons comprises two insulated amorphous metal ribbons. One of the ribbons has the offset longitudinal edge disposed on a first surface of the cylindrically wound compact configuration, and the other one of the two amorphous metal ribbons has one of its longitudinal edges offset on an opposing surface of the cylindrically wound compact configuration. Two electrical contacts are provided. One contact is disposed across the first surface of the cylindrically wound compact configuration and is electrically coupled to the offset exposed longitudinal edge of the corresponding and proximate amorphous metal ribbon. The other one of the electrical contacts is disposed on the opposing surface of the cylindrically wound compact configuration, and is electrically coupled to a plurality of points on the exposed longitudinal edge of the other one of the amorphous metal ribbon. The dielectric layers corresponding to the two amorphous metal ribbons are aligned with each other. The aligned dielectric layers are mutually aligned. Each amorphous metal ribbon is offset with respect to its corresponding dielectric layer in a direction perpendicular to the length of the ribbon, and is also offset from at least one other amorphous metal ribbon in the same but opposite direction. The relative offset of each amorphous metal ribbon with respect to its corresponding dielectric layer is identical for each ribbon and dielectric pair with the two pairs of dielectric and amorphous metal ribbons having an inverted geometric relationship with respect to each other within the cylindrically wound compact configuration.

The invention is not limited to just a pair of insulated ribbons, but extends to a plurality of such insulated ribbons. In the general case then, the electrical contact is disposed adjacent to the cylindrically wound compact configuration of the plurality of amorphous metal ribbons in a plane intersecting the configuration. The electrical contact is electrically coupled to the exposed edge of the amorphous metal ribbon at each point of intersection of the intersecting plane and the amorphous ribbon. The electrical contact is electrically coupled to selected ones of the plurality of amorphous metal ribbons.

The invention can alternatively be characterized as an integrated device for simultaneously and independently performing capacitive and inductive functions with low electrical series resistance for use in a power circuit. The device comprises a plurality of insulated amorphous metal ribbons. Each metal ribbon has a longitudinal length. The plurality of insulated amorphous metal ribbons are disposed in contact one with the other to form an insulated stack of the ribbons. The stack of the ribbons is wound to form a compact configuration. Each one of the amorphous metal ribbons has at least one nearest amorphous metal ribbon within the wound stack to form a corresponding pair of ribbons. At least one conductive winding is wound about the compact configuration of stacked amorphous metal ribbons. The amorphous metal ribbons provide a magnetic core for the winding. A plurality of electrical contacts are disposed adjacent to the compact configuration of stacked ribbons. Each contact is electrically coupled to a selected one of the ribbons at a plurality of points on the ribbon. Each amorphous metal ribbon has a corresponding electrical contact.

As a result, the integrated device provides a capacitance and inductance for use within a power circuit with enhanced electrical efficiency.

The plurality of insulated amorphous metal ribbons are cylindrically wound into a compact configuration forming a toroid. Each of the plurality of electrical contacts is disposed across and adjacent to the toroid within a plane intersecting a cross section of the toroid. The amorphous metal ribbon corresponding to each contact has a longitudinal edge exposed at least at that point within the intersecting plane and is coupled thereto through the corresponding electrical contact. Each amorphous metal ribbon is wound within the toroid through the intersecting plane.

The plurality of exposed points on each the ribbon is comprised of an exposed longitudinal edge of the ribbon. The exposed longitudinal edge is defined by an offset of the dielectric insulation from the longitudinal edge of the corresponding ribbon. The toroid has at least two opposing surfaces. Opposing longitudinal edges of each amorphous metal ribbon extends from each of the opposing surfaces. The plurality of electrical contacts are exposed proximate to the toroid and electrically coupled to selected ones of the ribbons on both opposing surfaces.

In one embodiment the integrated device further comprises two conductive windings wound about the plurality of stacked ribbons. The compact configuration of the stacked ribbon forms a magnetic circuit within both of the windings. The two windings and plurality of insulated ribbons provide an electrical transforming function.

The invention and its various embodiments may be better understood by now turning to the following drawings wherein like elements are referenced by like elements.

The invention and its various embodiments will be better understood by now turning to the following detailed description.

DETAILED DESCRIPTION OF THE PREFERRED EMBODIMENTS

A discrete device in which a capacitive and inductive function has been integrated is comprised of at least two insulated amorphous ribbons which are spirally wound to form a cylindrical toroid. Each of the amorphous metal ribbons is insulated from each other ribbon by a dielectric layer and wound in a stacked configuration to provide the capacitive function. Two conductive windings are then wrapped around segments of the cylindrical toroid to provide inductive and/or transforming functions as desired. A magnetic circuit is formed through the windings by the amorphous metal ribbons. A dielectric insulating layer between the ribbons is offset from the longitudinal edge of the ribbon so that the longitudnal edge of each ribbon is exposed. One ribbon has its longitudinal edge exposed on one surface of the toroid while another ribbon has its longitudinal edge exposed on the opposing surface of the toroid. Electrical contacts are then laid across an intersecting line contacting the exposed edge of each ribbon at a plurality of points. As a result, the electrical series resistance of each ribbon within the device is minimized thereby rendering a device practical for use within a power circuit.

Figure 1:
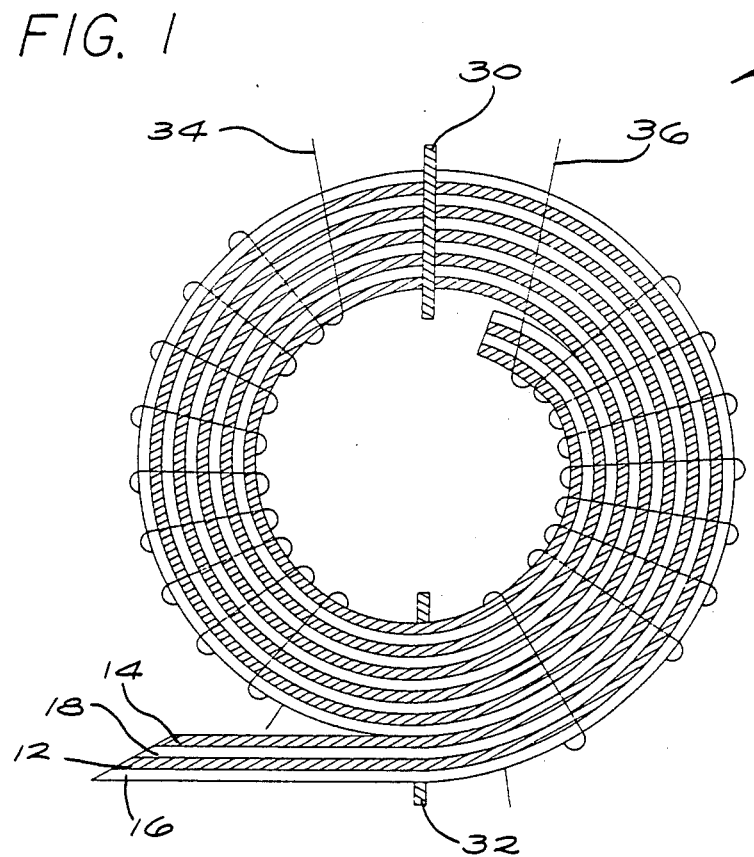
FIG. 1 is a simplified diagrammatic top view of a toroidally shaped, integrated device devised according to the invention.

FIG. 1 is a diagrammatic top view of an integrated device in which the capacitive and inductive functions are simultaneously and independently served according to the invention. The device, generally denoted by reference numeral 10, is toroidal or, more specifically, in the illustrated embodiment is a short cylindrical ring fabricated from the cylindrically wrapped plurality of insulated amorphous metal ribbons. However, it must be understood that although a toroidal or cylindrical geometry is preferred, the physical configuration of device 10 can be modified in an arbitrary fashion consistent with the teachings of the present invention without departing from its scope. For example, if the application required, device 10 may be rectangular, triangular, elliptical or free-form in plan view.

In the depiction of FIG. 1, the end portion of a pair of insulated foils has been drawn away from device 10 in order to be more clearly visualized. Furthermore, in the illustrated embodiment device 10 is fabricated from a wound wrapping of a pair of insulated foils, namely amorphous metal foils 12 and 14, separated by insulating layers 16 and 18. However, it is entirely within the scope of the invention that a greater number of insulated foils may be employed if desired.

The choice of the metal composition for amorphous metal foils 12 and 14 is dependent upon the desired magnetic properties within the integrated device and any one of a large number of choices may be utilized. LIN et al., *"Amorphous Metal Core Laminations"*, U.S. Pat. No. 4,364,020 (1982) and INOMATA et al., "Rolled Core," U.S. Pat. No. 4,368,447 (1983), each incorporated herein by reference, discuss several examples of amorphus metals which may be used and how they may be handled.

Insulation layers 16 and 18 may similarly be chosen from any one of a wide large variety of insulators now known or later devised. Any material which iis flexible, has a large dielectric constant, and a high dielectric breakdown strength would be preferred. Typically, insulation layers 16 and 18 may be a coating of polymeric material, an adhesive, a nonadhesive film, a mixture of dielectrics, an impregnant, a composite, a filled polymer, or some type of coated material.

The insulated foil layers 12-18 are assembled in flat form and are rolled to form the toroid to FIG. 1 in a manner to be described in greater detail below in connection with FIG. 2. Thereafter, the toroid is annealed at 300 to 400 degrees C., if desired, to alter the hysteresis characteristics of the core, if needed for certain applications. Thus, a high temperature dielectric for layers 16 and 18 is desired and in the preferred embodiment a polyimide, polyamide, or a film of the same is utilized.

Figure 2:
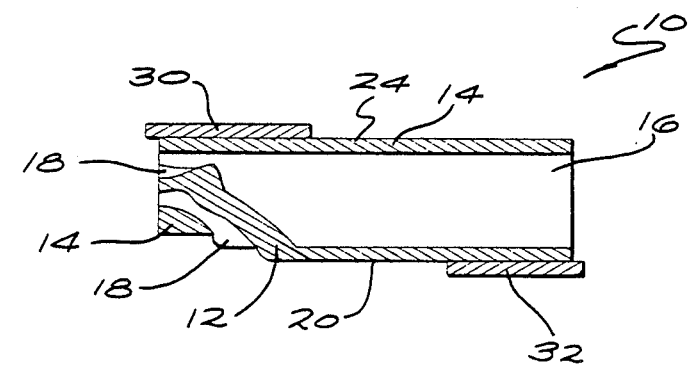
FIG. 2 is a simplified partially cut-away side view of the amorphous metal strips and interlying dielectric layers from which the amorphous metal toroid of FIG. 1.

Turn now to FIG. 2 wherein strips 12-18 are shown in side view with the underlying layers shown in a partially cutaway view. As seen in the view of FIG. 2, dielectric layer 16 is on the outside. Amorphous metal layer 12 is disposed underneath in contact with dielectric layer 16. Amorphous metal layer 12 is shifted downwardly in the depiction of FIG. 1 to expose a lower edge 20 above the proximate corresponding edge of dielectric layer 16. Dielectric layer 18 is disposed beneath and in contact with amorphous metal layer 12. Dielectric layer 18 is vertically aligned with dielectric layer 16. Amorphous metal layer 14 is then disposed underneath and in contact with dielectric layer 18. Amorphous metal layer 14 is shifted upwardly with respect to dielectric layers 16 and 18. Therefore, amorphous metal layer 14 has an upper edge 24 exposed above the proximate corresponding edge of dielectric layers 16 and 18.

It may now thus be readily appreciated that each amorphous metal layer has an exposed edge on one or the other longitudinal side of the strip of layers 12-18. Therefore, as shown in FIG. 1 a front bar contact 30 is placed along a radial line on one side of coiled device 10 to contact the edges of one of the amorphous layers 12 or 14 while a corresponding rear contact 32 is disposed on the opposing end of the same diameter but on the opposite side of coil device 10 to contact exposed edge of the other amorphous layer. For example, in the illustrated embodiment front electrical contact 30 may be considered as contacting edge 24 of amorphous layer 14 while rear contact 32 contacts edge 20 of amorphous layer 12.

As also diagrammatically depicted in FIG. 1, coil device 10 is provided with a primary winding 34 wound around one segment of the toroidal coil and a secondary winding 36 wound about an opposing segment. Thus, windings 34 and 36 may be separately used as inductors and, in combination, as coils of a transformer. It is to be understood that the form and placement of wire windings 34 and 36 on the coil device 10 can assume a large number of variations and be fabricated in a wide variety of ways consistent with conventional principles without departing from the scope of the invention.

What results from the completed device of FIG. 1 is an integrated device capable of separately and simultaneously capacitive and inductive functions with a reduced equivalent series resistance. In tests thus far conducted a device constructed according to the invention has a reduction of more than 800 percent in the equivalent series resistance as compared to prior art devices. The reduction in the equivalent series resistance is believed due to the connection through contact bars 30 and 32 at multiple points on each amorphous metal ribbon 12 and 14, thereby reducing the effective electrical path for current conduction within amorphous metal ribbons 16 an 18. In the illustrated embodiment, the reduced effective electrical path is approximately one inch. Whereas in prior art devices, where electrical connection was made at the end of each length of amorphous metal ribbon, the electrical path was as long as the ribbon, typically many tens of feet.

As a result, a device built acording to the invention can be practically utilized in a power circuit where electrical consumption within the power circuit must be minimized. For example, two devices were made as shown in FIG. 1 except that one device was provided with electrical contacts 30 and 32 and the other device was provided with conventional end contacts to amorphous metal layers 12 and 14. The metal ribbon was five feet in length and utilized Kapton film as the interlying dielectric. The equivalent series resistance at 4 Mhz was 9.69 ohms for a device constructed according to the prior art teachings, while a device constructed according to the present invention gave a much lower equivalent series resistance reading at 1.2 ohms. This large difference is sufficient to allow the integrated capacitive and inductive device of FIG. 1 to be utilized within a power circuit whereas the equivalent series resistance of prior art devices prohibited such use where circuit efficiency was a limiting factor.

Although device 10 is particularly adapted for efficient use within power circuits, it may be utilized in any electronic circuitry since the capacitive and inductive functions performed by the device are entirely equivalent to those provided by the discrete components which it replaces. Therefore, device 10 may be used in a power circuit without special consideration given to peculiar performance characteristics or inherent structural network limitations of such integrated devices as are typical of the prior art.

The device made according to the invention may be incorporated and used within a circuit exactly as discrete power components without any compensation in the electrical design for its integrated nature.

Many modifications and alterations may be made by those having ordinary skill in the art without departing from the spirit and scope of the invention. Therefore, it must be understood that the illustrated embodiment has been set forth only for the purposes of example and should not be taken as limiting the invention which is defined in the following claims.

We claim:

1. An integrated electrical device for independently providing a capacitive and inductive function comprising:
   a plurality of insulated amorphous metal ribbons each ribbon characterized by a longitudinal length, said plurality of insulated ribbons disposed in proximity to each other in a stacked relationship, said plurality of stacked amorphous metal ribbons wound on themselves to form a compact configuration, at least one of said ribbons having an exposed edge at least at a plurality of points along said longitudinal length;
   at least one conductive winding having at least one loop wound about said compact configuration of said plurality of ribbons; and
   at least one electrical connector disposed in proximity to said compact configuration of said plurality of ribbons and electrically coupled to said plurality of points along said longitudinal edge of said at least one ribbon,
   whereby said device independently and simultaneously performs said capacitive and inductive functions with minimized electrical series resistance for said device.

2. The integrated device of claim 1 wherein each insulated ribbon is comprised of a first layer of dielectric material and a second layer of amorphous metal, said dielectric layer and amorphous metal being offset with respect to each other.

3. The integrated device of claim 2 wherein said offset amorphous metal ribbon is offset from its corresponding dielectric layer to expose a longitudinal edge of said amorphous metal ribbon.

4. The integrated device of claim 1 wherein said compact configuration is a cylindrically wound toroid of said plurality of ribbons.

5. The integrated device of claim 4 wherein each insulated ribbon is comprised of a first layer of dielectric material and a second layer of amorphous metal, said dielectric layer and amorphous metal being offset with respect to each other and wherein said offset amorphous metal ribbon is offset from its corresponding dielectric layer to expose a longitudinal edge of said amorphus metal ribbon.

6. The integrated device of claim 5 wherein said plurality of amorphous metal ribbons comprises two insulated amorphous metal ribbons, one of said ribbons having said offset longitudinal edge disposed on a first surface of said cylindrically wound compact configuration and said other one of said two amorphous metal ribbons having one of its longitudinal edges offset on an opposing surface of said cylindrically wound compact configuration, two of said electrical contacts being provided, one contact disposed across said first surface of said cylindrically wound compact configuration and electrically coupled to said offset exposed longitudinal edge of said corresponding and proximate amorphous metal ribbon, the other one of said electrical contacts disposed on the opposing surface of said cylindrically wound compact configuration and electrically coupled to a plurality of points on said exposed longitudinal edge of said other one of said amorphous metal ribbon.

7. The integrated device of claim 6 wherein said dielectric layers corresponding to said two amorphous metal ribbons are aligned with each other.

8. The integrated device of claim 7 wherein said aligned dielectric layers are mutually aligned.

9. The integrated device of claim 8 wherein each amorphous metal ribbon is offset with respect to its coresponding dielectric layer in a direction perpendicular to the longitudinal length of said ribbon, and is also offset from at least one other amorphous metal ribbon in the same but opposite direction.

10. The integrated device of claim 9 wherein the relative offset of each amorphous metal ribbon with respect to its corresponding dielectric layer is identical for each ribbon and dielectric pair, with said two pairs of dielectric and amorphous metal ribbons having an inverted geometric relationship with respect to each other within said cylindrically wound compact configuration.

11. The integrated device of claim 4 wherein said electrical contact is disposed adjacent to said cylindrically wound compact configuration of said plurality of amorphous metal ribbons in a plane intersecting said configuration, said electrical contact electrically coupled to said exposed edge of said amorphous metal ribbon at each point of intersection of said intersecting plane and said amorphous ribbon.

12. The integrated device of claim 1 wherein said electrical contact is electrically coupled to selected ones of said plurality of amorphous metal ribbons.

13. The integrated device of claim 1 wherein said plurality of amorphous metal ribbons are arranged and configured in proximity to each other within said compact configuration in a pairwise basis, and further comprising a plurality of said electrical contacts each contact electrically coupled to one of said amorphous metal ribbons of each pair of ribbons.

14. An integrated device for simultaneously and independently performing capacitive and inductive functions with low electrical series resistance for use in a power circuit comprising:
   a plurality of insulated amorphous metal ribbons, each metal ribbon having a longitudinal length, said plurality of insulated amorphous metal ribbons being disposed in contact one with the other to form an insulated stack of said ribbons, said stack of said ribbons wound to form a compact configuration, each one of said amorphous metal ribbons having at least one nearest amorphous metal ribbon within said wound stack to form a corresponding pair of ribbons;
   at least one conductive winding wound about said compact configuration of stacked amorphous metal ribbons, said amorphous metal ribbons providing a magnetic core for said winding; and a plurality of electrical contacts disposed adjacent to said compact configuration of stacked ribbons, each contact electrically coupled to a selected one of said ribbons at a plurality of points on said ribbon, each amorphous metal ribbon having a corresponding electrical contact, whereby said integrated device provides a capacitance and inductance for use within a power circuit with enhanced electrical efficiency.

15. The integrated device of claim 14 wherein said plurality of insulated amorphous metal ribbons are cylindrically wound into a compact configuration forming a toroid, each of said plurality of electrical contacts disposed across and adjacent to said toroid within a plane intersecting a cross section of said toroid, said amorphous metal ribbon corresponding to each contact having a longitudinal edge exposed at least at that point within said intersecting plane and coupled thereto through said corresponding electrical contact, each amorphous metal ribbon wound within said toroid through said intersecting plane.

16. The integrated device of claim 15 wherein said plurality of exposed points on each said ribbon is comprised of an exposed longitudinal edge of said ribbon.

17. The integrated device of claim 16 wherein said exposed longitudinal edge is defined by an offset of said dielectric insulation from said longitudinal edge of said corresponding ribbon.

18. The integrated device of claim 15 wherein said toroid has at least two opposing surfaces, opposing longitudinal edges of each amorphous metal ribbon extending from each of said opposing surfaces, said plurality of electrical contacts being exposed proximate to said toroid and electrically coupled to selected ones of said ribbons on both opposing surfaces.

19. The integrated device of claim 17 wherein said toroid has at least two opposing surfaces, opposing longitudinal edges of each amorphous metal ribbon extending from each of said opposing surfaces, said plurality of electrical contacts being exposed proximate to said toroid and electrically coupled to selected ones of said ribbons on both opposing surfaces.

20. The integrated device of claim 14 further comprising two conductive windings wound about said plurality of stacked ribbons, said compact configuration of said stacked ribbon forming a magnetic circuit within both of said windings, said two windings and plurality of insulated ribbons providing an electrical transforming function.

* * * * *